United States Patent [19]

Pucher

[11] 4,329,835
[45] May 18, 1982

[54] LATCH FOR CORN HARVESTING HEADER

[75] Inventor: Richard A. Pucher, Leola, Pa.

[73] Assignee: Sperry Corporation, New Holland, Pa.

[21] Appl. No.: 232,278

[22] Filed: Feb. 6, 1981

[51] Int. Cl.³ .................. A01D 75/18; A01D 45/00
[52] U.S. Cl. ................................. 56/320.1; 56/119
[58] Field of Search ............... 56/98, 119, 105, 106, 56/320.1

[56] References Cited

U.S. PATENT DOCUMENTS

| | | | |
|---|---|---|---|
| 2,473,978 | 6/1949 | Van Buskirk | 56/119 |
| 2,549,999 | 4/1951 | Andrews | 56/106 |
| 2,728,184 | 12/1955 | Fergason | 56/119 |
| 3,271,940 | 9/1966 | Ashton et al. | 56/119 |
| 3,584,444 | 6/1971 | Sammann et al. | 56/119 |
| 4,037,393 | 7/1977 | Anderson | 56/119 |
| 4,227,368 | 10/1980 | Mossman et al. | 56/320.1 |

FOREIGN PATENT DOCUMENTS 2345494  4/1974  Fed. Rep. of Germany ........ 56/119

Primary Examiner—Paul J. Hirsch
Attorney, Agent, or Firm—Larry W. Miller; Frank A. Seemar

[57] ABSTRACT

A latch for the hood member of the corn harvesting header is disclosed wherein the latching mechanism includes a self-centering guide device to provide a proper latching action to lock the hood member in an operative position. A stop affixed to the hood member and projecting inwardly therefrom is engageable with a V-shaped guide device formed into the latch lock mechanism to guide the stop into a notch formed in the latch lock mechanism. When the stop is seated in the notch, the latch is properly aligned with the latch lock mechanism for proper engagement therebetween. A release rod connected to the latch provides for convenient operation of the latching mechanism.

8 Claims, 5 Drawing Figures

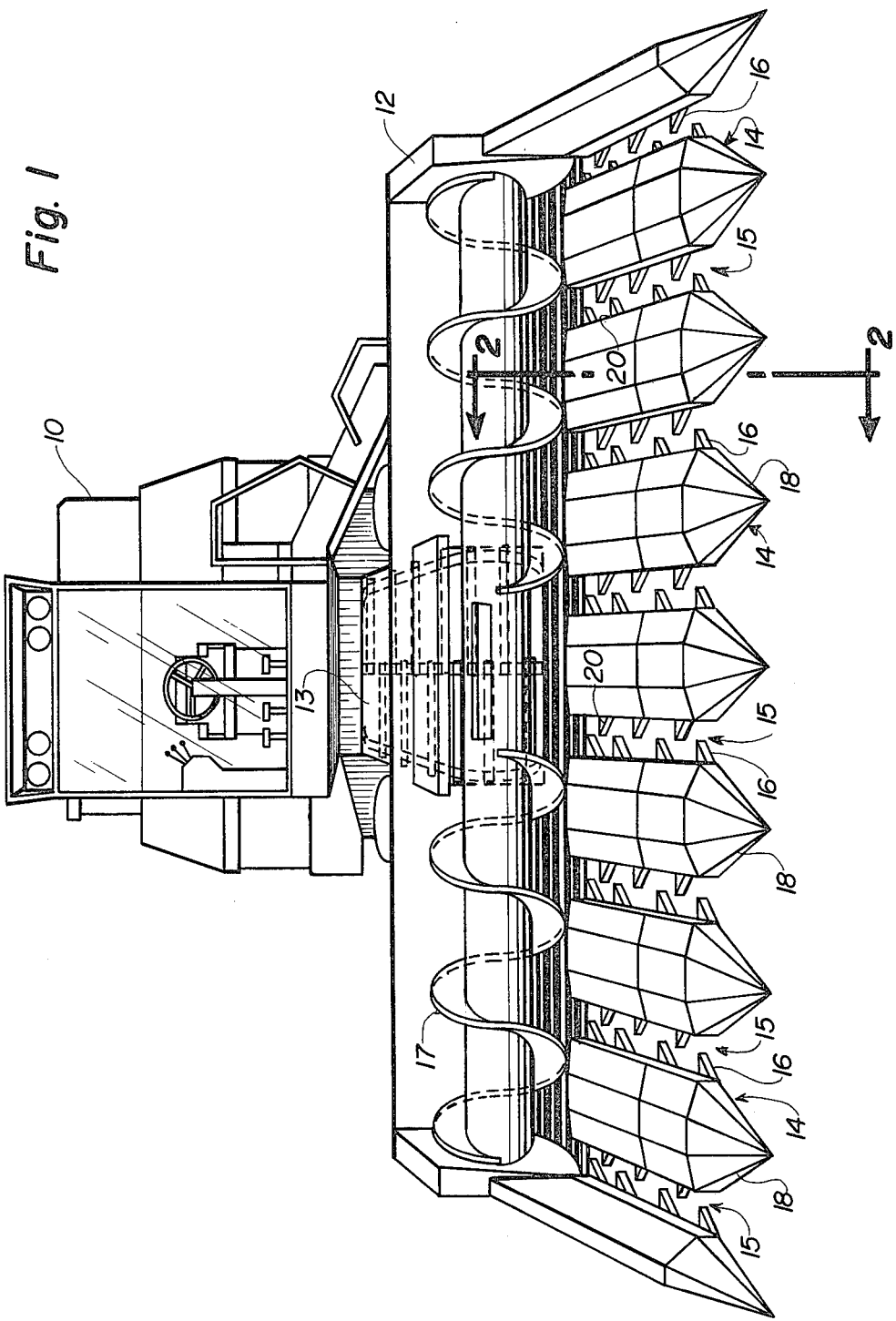

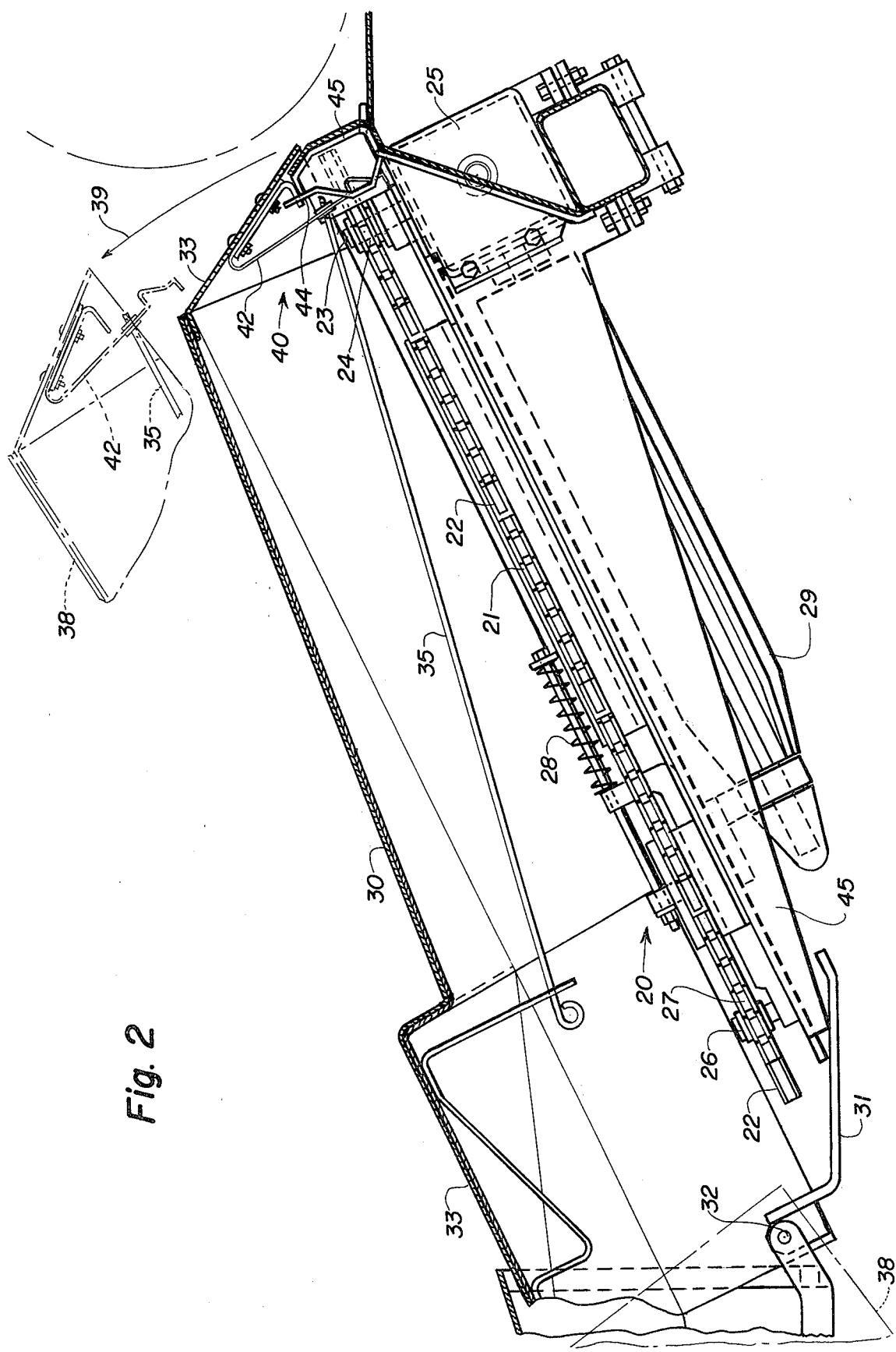

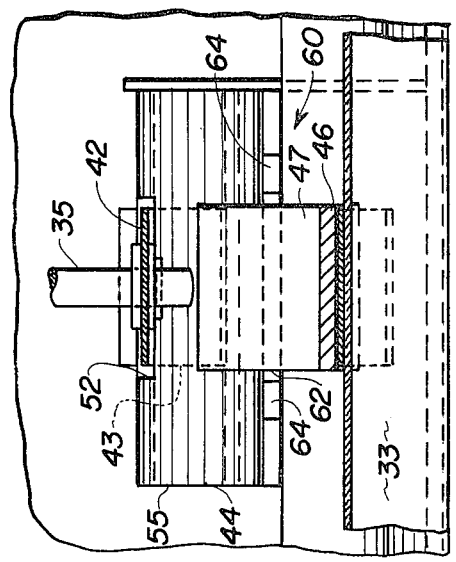
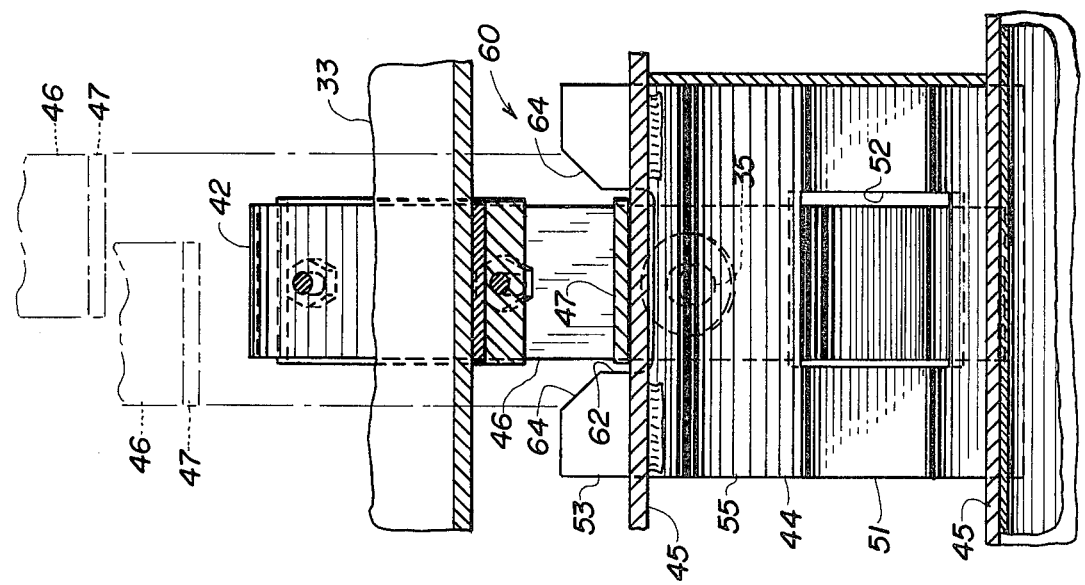
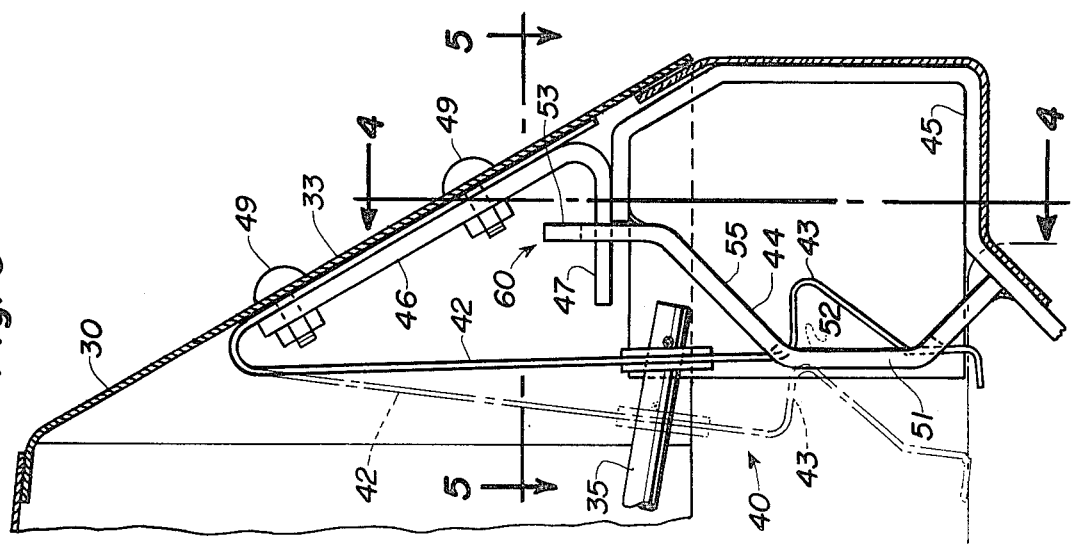

LATCH FOR CORN HARVESTING HEADER

BACKGROUND OF THE INVENTION

The present invention relates generally to corn harvesting machines and, more particularly, to a latching mechanism for the hood member forming a part of the row crop dividers on a corn harvesting header.

Generally, a corn harvesting header includes a plurality of fore-and-aft extending row units for harvesting a corresponding number of rows of corn. Each row unit includes a elongated passageway and a gathering means operable therewithin for harvesting ears of corn and conveying them rearwardly for further harvesting treatment. Corn harvesting headers customarily include a hood member formed of sheet metal and situated between adjacent row unit passageways to serve as a crop divider to guide the rows of crop to their respective row units and as a shield for the drives to the respective crop gathering mechanisms.

To provide access to the gathering mechanism drive for service and maintenance thereof, each hood member is customarily pivotally mounted on the corresponding row unit frames and secured by a latching mechanism spaced some distance from the pivot axis. Due to the spaced relationship between the pivotal mounting of the hood member and the latching mechanism and further due to the flexibility of the sheet metal construction of the hood member, it has been found that proper alignment of the mating members of the latch mechanism can be difficult to obtain.

One form of prior art latching mechanism, spaced some distance from the pivot axis of the hood member, includes a spring-type latch affixed to the moveable hood member and engageable with a locking member stationarily affixed to the row unit frame, relative to the spring-type latch, through an opening therein. However, this particular latching mechanism also suffers from the aforementioned alignment problems, as the spring-type latch is not always properly aligned with the opening in the locking member when the hood member is closed in the operative position. This invention presents a solution to these alignment problems.

SUMMARY OF THE INVENTION

It is an object of this invention to overcome the aforementioned disadvantages of the prior art by providing a position seeking guide device for the latching mechanism on the hood divider of a corn harvesting header.

It is another object of this invention to provide a hood member that can be easily closed and locked into an operative position.

It is a feature of this invention that the latch mechanism for a corn harvesting header divider hood can be engaged and released with a minimum of effort by the operator.

It is another feature of this invention that mating members of the latch mechanism of a hood divider on a corn harvesting header will be automatically aligned when the hood member is closed into the operative position.

It is an advantage of this invention that the hood member of the row unit crop divider on a corn harvesting header can be conveniently and easily moved between a closed operative position and an open access position.

It is a further object of this invention to provide a latch mechanism for a row unit crop divider on a corn harvesting header which is durable of construction, inexpensive of manufacture, carefree of maintenance, facile in assemblage and simple and effective in use.

These and other objects, features and advantages are accomplished according to the instant invention by providing a latch for the hood member of a corn harvesting header wherein the latching mechanism includes a self-centering guide device to provide a proper latching action to lock the hood member in an operative position. A stop affixed to the hood member and projecting inwardly therefrom is engageable with a V-shaped guide device formed into the latch lock mechanism to guide the stop into a notch formed in the latch lock mechanism. When the stop is seated in the notch the latch is properly aligned with the latch lock mechanism for proper engagement therebetween. A release rod connected to the latch provides for convenient operation of the latching mechanism.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a front elevational view of a mobile crop harvesting machine, commonly referred to as a combine, having a corn harvesting header attached thereto, incorporating the principles of the instant invention;

FIG. 2 is an enlarged partial cross sectional view through the row unit crop divider between adjacent row unit passageways taken along lines 2—2 of FIG. 1;

FIG. 3 is an enlarged view of the latching mechanism seen in FIG. 2;

FIG. 4 is a cross sectional view of the latch mechanism seen in FIG. 3 taken along lines 4—4; and FIG. 5 is a cross sectional view of the latch mechanism seen in FIG. 3 taken along lines 5—5.

DETAILED DESCRIPTION OF THE PREFERRED EMBODIMENT

Referring now to the drawings and, particularly to FIG. 1, a front elevational view of a corn harvesting header attached to the front of a mobile crop harvesting machine can be seen. The header 12 is mounted to the forward end of the mobile crop harvesting machine 10 to detach ears of corn from rows of standing corn stalks and convey them rearwardly through the feeder housing 13 for further harvesting treatment. Each fore-and-aft extending row unit 14 includes a passageway 15 positioned for engaging a row of standing corn stalks and gathering means 16 operable within the passageway 15 for conveying the corn rearwardly toward the transverse auger 17, which consolidates the harvested crop for discharge to the feeder housing 13. A crop divider 18 is positioned between adjacent row unit passageways 15 to direct crop toward the respective passageways 15 and to shield the drives for the gathering means from dirt and debris falling thereon.

Referring now to FIG. 2, an enlarged partial cross sectional view of the crop divider 18 can be seen. The gathering means 16 is seen in the form of an endless gathering chain 21 upon which a plurality of lugs 22 are attached. The drive means 20 for the gathering chains 21 includes a rotatable drive shaft 23 projecting upwardly from a gear box 25 and having a drive sprocket 24 affixed thereto, and a driven shaft 26 and affixed driven sprocket 27. A tensioning mechanism 28 maintains a proper driving relationship between the gathering chains 21 and the drive sprocket 24. A pair of counter rotating stalk rolls 29 are generally provided within the row unit passageway 15 for pulling the corn stalks downwardly through an opening smaller than that through which the ear of corn could pass.

The crop divider 18 includes a hood member 30 usually constructed of sheet metal. The hood member 30 is pivotally attached to the row unit 14 through a mounting bracket 31 such that the hood member 30 is rotatable about the pivot axis 32. Spaced rearwardly from the pivot axis 32 is the latching mechanism 40 for locking the hood member 30 into a fixed operative position relative to the row unit 14. A release rod 35 extends forwardly from the latching mechanism for convenient access by the operator.

As can be seen in the enlarged view of the latching mechanism found in FIG. 3, the latching mechanism includes a spring-type latch 42 affixed to the hood member 30 and movable therewith and a latch lock member 44 fixedly secured to the frame 45 of the row unit 14. The pivotal movement of the hood member 30 in moving from a fixed operative position relative to the row unit to an open access position for service and maintenance to the row unit drives can best be seen in FIG. 2. The hood member 38 seen in phantom in FIG. 2 is indicative of the selective pivotal movement of the hood member 30 indicated by the arrow 39.

Referring now to FIGS. 3, 4 and 5, the details of the latching mechanism 40 can be seen. A stop 46 having a leg 47 projecting angularly inwardly from the outer skin 33 of the hood member 30 is attached to the spring-type latch 42 and the hood member 30 by connecting bolts 49. As can best be seen in FIG. 4, the stop 46 is aligned with the spring-type latch 42. Both the stop 46 and the spring-type latch 42 are movable with the hood member 30. The spring-type latch 42 includes an offset portion 43 engageable with the latch lock member 44 to lock the hood member 30 in a fixed operative position.

The latch lock member 44 includes a first vertical portion 51 having an opening 52 therein through which the offset portion 43 of the spring-type latch 42 passes for engagement between the spring-type latch 42 and the latch lock member 44. The latch lock member 44 further includes a second vertical portion 53 above and rearward of the first vertical portion 51 and an intermediate connecting portion 55 interconnecting the first and second vertical portions 51, 53. The latch lock member 44 is secured, as by welding, to the frame 45 of the row unit 14.

The second vertical portion 53 has a guide means 60 formed therein for automatically aligning the spring-type latch 42 with the opening 52 in the first vertical portion 51 of the latch lock member 44. The guide means 60 includes a notch 62 formed in the second vertical portion 53 and being of sufficient size to receive the seat the leg 47 of the stop 46. The notch 62 is positioned such that, when the leg 47 is seated therein, the offset portion 43 of the spring-type latch 42 is aligned with the opening 52 in the latch lock member 44 to permit proper engagement therebetween. The guide means 60 further includes inclined ramp portions 64 formed into the second vertical portion 53 to both sides of the notch 62. As is best seen in FIG. 4, if the spring-like latch 42 is not properly aligned with the opening 52, the leg 47 of the stop 46 engages one of the inclined ramp portions 64, as indicated in phantom in FIG. 4, so as to be guided into the notch 62 whereby the leg 47 is properly seated and the offset portion 43 properly aligned with the opening 52.

In operation, to release the latching mechanism 40 and permit the hood member 30 to be rotated about the pivot axis 32, so as to provide access in the gathering chain drive 20, the operator need only to pull on the release rod 35 which is connected immediately above the offset area 43 of the spring-type latch 42, to extract the offset portion 43 from the opening 52 and the latch lock member 44. When the hood member 30 is returned to the closed operative position, the hood member 30 is lowered toward the row unit 14 resulting in the leg 47 of the stop 46 engaging the guide means 60. If the spring-type latch 42 is not properly aligned with the opening 52 and the latch lock member 44, the leg 47 will engage one of the inclined ramp portions 64 of the guide means 60 and direct the leg 47 into the notch 62. When the leg 47 becomes seated in the notch 62, the spring-type latch 42 automatically engages the latch lock member 44, as seen in phantom in FIG. 3. When the offset member 43 engages the first vertical portion 51 of the latch lock member 44, the spring-type latch 42 is forced forwardly until the offset portion 43 is aligned with the opening 52 whereupon the offset portion 43 slides through the opening 52 and into engagement with the connecting portion of the latch lock member 44 to lock the hood member 30 into the fixed operative position relative to the row unit 14.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such a description, may be employed in other embodiments without departing from the scope of the invention. Accordingly, the following claims are intended to protect the invention broadly as well as in the specific form shown herein.

Having thus described the invention, what is claimed is:

1. In a corn harvesting header having a plurality of row units for receiving and harvesting rows of corn, each said row unit having an elongated passageway disposed in a fore-and-aft direction, gathering means operable within said passageway to convey crop rearwardly for further harvesting treatment and drive means for powering said gathering means, said header further having at least one crop divider situated between adjacent passageways, said at least one crop divider being operable to guide crop toward said adjacent row units and to protect the corresponding said drive means from debris becoming engaged therewith, said at least one crop divider having a hood member pivotally mounted on said header for rotative movement in a generally vertical plane about a substantially horizontal pivot axis between a fixed operative position and an open access position so as to provide access to said drive means for service and maintenance thereof, said hood member having a latching means remotely spaced from said pivot axis for releasably securing said hood member in said fixed operative position relative to said pivot axis, an improved latching means comprising:

a latch lock member affixed to the corresponding said row unit and having an opening therein;

a latch affixed to said hood member and positioned such that when said hood member is moved to said operative position said latch is engageable with said latch lock member through said opening to releasably secure said hood member in said fixed operative position;

a stop affixed to said hood member and movable therewith; and guide means mounted on said corresponding row unit for operative communication with said stop, such that said hood member is guided into a position wherein said latch is aligned with the opening in said latch lock member for proper engagement therebetween.

2. The corn harvesting header of claim 1 wherein said latch includes a release means operatively connected thereto for selectively disengaging said latch from said latch lock member so that said hood member can be rotated about said pivot axis.

3. The corn harvesting header of claim 2 wherein said hood member has an interior side facing said corresponding drive means, said latch comprising a spring member affixed to said interior side of said hood member, said latch including an offset portion alignable with the opening of said latch lock member and insertable therethrough to engage with said latch lock member and secure said hood member in said fixed position.

4. The corn harvesting header of claim 3 wherein said guide means is affixed to said latch lock member, said stop being connected to said latch and including a leg engageable with said guide means to position said hood member such that said offset portion of said spring member is aligned with the opening in said latch lock member.

5. The corn harvesting header of claim 4 wherein said guide means includes a notch of sufficient size to receive and seat said leg of said stop and an inclined ramp portion adjacent to each side of said notch, said ramp portions being inclined upwardly and outwardly from said notch to guide said leg of said stop toward said notch, said notch being positioned relative to the opening in said latch lock member such that when said leg is seated in said notch said offset portion of said latch is aligned with the opening in said latch lock member.

6. The corn harvesting header of claim 5 wherein said latch lock member is integrally formed with said guide means, said latch lock member having a first vertical portion, a second vertical portion above and rearward of said first vertical portion and an intermediate portion interconnecting said first and second vertical portions, said first vertical portion having said opening therein, said second vertical portion having said notch and said ramp portions formed therein.

7. The corn harvesting header of claim 6 wherein said release means comprises an elongated rod attached to said spring member above said offset portion.

8. The corn harvesting header of claim 7 wherein said pivot axis is positioned proximate to the forward end of said corresponding row unit, said latching means being spaced rearwardly of said pivot axis, said elongated rod extending forwardly from said spring member to a position proximate to said pivot axis.

* * * * *